United States Patent [19]

McLean

[11] Patent Number: 4,539,797
[45] Date of Patent: Sep. 10, 1985

[54] METHOD AND APPARATUS FOR CHECKING LUBRICANT VOLUME IN A DISC CUTTERBAR

[75] Inventor: Kenneth W. McLean, New Holland, Pa.

[73] Assignee: Sperry Corporation, New Holland, Pa.

[21] Appl. No.: 585,726

[22] Filed: Mar. 2, 1984

[51] Int. Cl.³ ............................................. A01D 69/12
[52] U.S. Cl. ......................................... 56/12.3; 56/13.6
[58] Field of Search ............................ 56/12.3, 13.6, 6

[56] References Cited

U.S. PATENT DOCUMENTS

| | | | |
|---|---|---|---|
| 3,141,341 | 7/1964 | Hutchinson | 56/12.3 |
| 3,416,295 | 12/1968 | Kaufman | 56/12.3 |
| 3,507,102 | 4/1970 | Kline et al. | 56/12.3 |
| 3,524,306 | 8/1970 | Reber | 56/12.3 |
| 3,656,284 | 4/1972 | Meek et al. | 56/14.5 |
| 3,698,162 | 10/1972 | Scarnato et al. | 56/14.4 |
| 4,253,294 | 3/1981 | Zweegers | 56/13.6 |

Primary Examiner—Paul J. Hirsch
Attorney, Agent, or Firm—Larry W. Miller; Frank A. Seemar; Darrell F. Marquette

[57] ABSTRACT

A method and apparatus for checking the volume of lubricant in the rotary cutterbar of a disc mower-conditioner is disclosed wherein the header of the disc mower-conditioner is provided with a jackstand to affect a tilting of the disc cutterbar at a predetermined angle relative to horizontal. The fill hole for adding lubricant to the cutterbar is positioned such that the volume of the cutterbar vertically below the fill hole when the cutterbar is tilted at the predetermined angle is substantially equal to the recommended volume of lubricant to be carried by the entire disc cutterbar. The proper volume of lubricant for the cutterbar can easily be determined by filling the cutterbar with lubricant up to the fill hole when the cutterbar is tilted at the predetermined angle.

23 Claims, 6 Drawing Figures

METHOD AND APPARATUS FOR CHECKING LUBRICANT VOLUME IN A DISC CUTTERBAR

BACKGROUND OF THE INVENTION

The present invention relates generally to hay harvesting machines, commonly referred to as mower-conditioners, and more particularly, to an improved system for determining the proper amount of lubricant to be placed within the rotary cutterbar of a disc mower-conditioner.

Mower-conditioners have been provided for the harvesting of hay for a number of years. A mower-conditioner severs standing crop material and conveys the severed crop material rearwardly into a conditioning mechanism without depositing the severed crop upon the ground. A disc mower-conditioner is provided with a disc cutterbar having a number of transversely spaced rotatable cutter members operable to sever standing crop material by an impact action. A conditioning mechanism mounted rearwardly of the disc cutterbar is operable to receive and condition severed crop material.

A disc cutterbar includes a generally hollow support bar in which is housed a drive transmission mechanism, generally in the form of a series of intermeshing gears. The disc cutters are rotatably supported on the support bar and connected to a corresponding gear to affect rotation thereof when the drive transmission mechanism is rotatably driven by a primary drive mechanism. For the proper operation of the drive transmission gears, a correct amount of lubricant must be present within the support bar. Typically, the support bar is considerably wider and longer than it is thick, making the correct depth of lubricant a very critical value since too much lubricant will cause overheating and too little lubricant will not provide adequate lubrication for the drive transmission gears.

Further complicating the determination of the proper lubricant within the cutterbar is the difficulty in determining when the cutterbar is properly leveled in both the side-to-side direction and the front to rear direction. Furthermore, because of the weight of the cutterbar and its length, the support bars are prone to sagging near the center resulting in the lubricant being non-uniformly distributed within the support bar even when the cutterbar is properly leveled. Accordingly, not only is leveling the support bar in two directions inconvenient, it can also be unreliable as it is dependent upon the condition of the cutterbar being serviced.

SUMMARY OF THE INVENTION

It is an object of this invention to overcome the aforementioned disadvantages of the prior art by providing an improved method and apparatus for checking the lubricant level in a disc cutterbar.

It is another object of this invention to provide a more reliable and accurate method for determining the proper volume of lubricant in a disc cutterbar.

It is still another object of this invention to provide a mechanism for tilting the cutterbar to a predetermined angle such that the volume of lubricant within the cutterbar below the fill hole is equal to the recommended volume of lubricant for proper operation of the cutterbar.

It is a feature of this invention that a jackstand can be operated in conjunction with the header lift mechanism for a disc mower-conditioner to facilitate the checking of the lubricant volume within the disc cutterbar.

It is an advantage of this invention that irregularities in the structure of the cutterbar will have minimal effects on the checking of lubricant volume within the cutterbar.

It is another advantage of this invention that the proper lubricant volume for a disc cutterbar can be obtained quickly and easily.

It is another feature of this invention that the cutterbar is positioned at the necessary angle when one end of the cutterbar is supported on the ground and the other end of the cutterbar is supported by a jackstand resting upon the ground at substantially the same level as the lower end of the cutterbar.

It is a further object of this invention to provide a mechanism for facilitating the checking of lubricant volume within the support bar of a disc mower-conditioner that durable of construction, inexpensive of manufacture, carefree of maintenance, facile in assemblage, and simple, effective and accurate in use.

These and other objects, features and advantages are accomplished according to the instant invention by providing a method and apparatus for checking the volume of lubricant in the rotary cutterbar of a disc mower-conditioner wherein the header of the disc mower-conditioner is provided with a jackstand to affect a tilting of the disc cutterbar at a predetermined angle relative to horizontal. The fill hole for adding lubricant to the cutterbar is positioned such that the volume of the cutterbar vertically below the fill hole when the cutterbar is tilted at the predetermined angle is substantially equal to the recommended volume of lubricant to be carried by the entire disc cutterbar. The proper volume of lubricant for the cutterbar can easily be determined by filling the cutterbar with lubricant up to the fill hole when the cutterbar is tilted at the predetermined angle.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
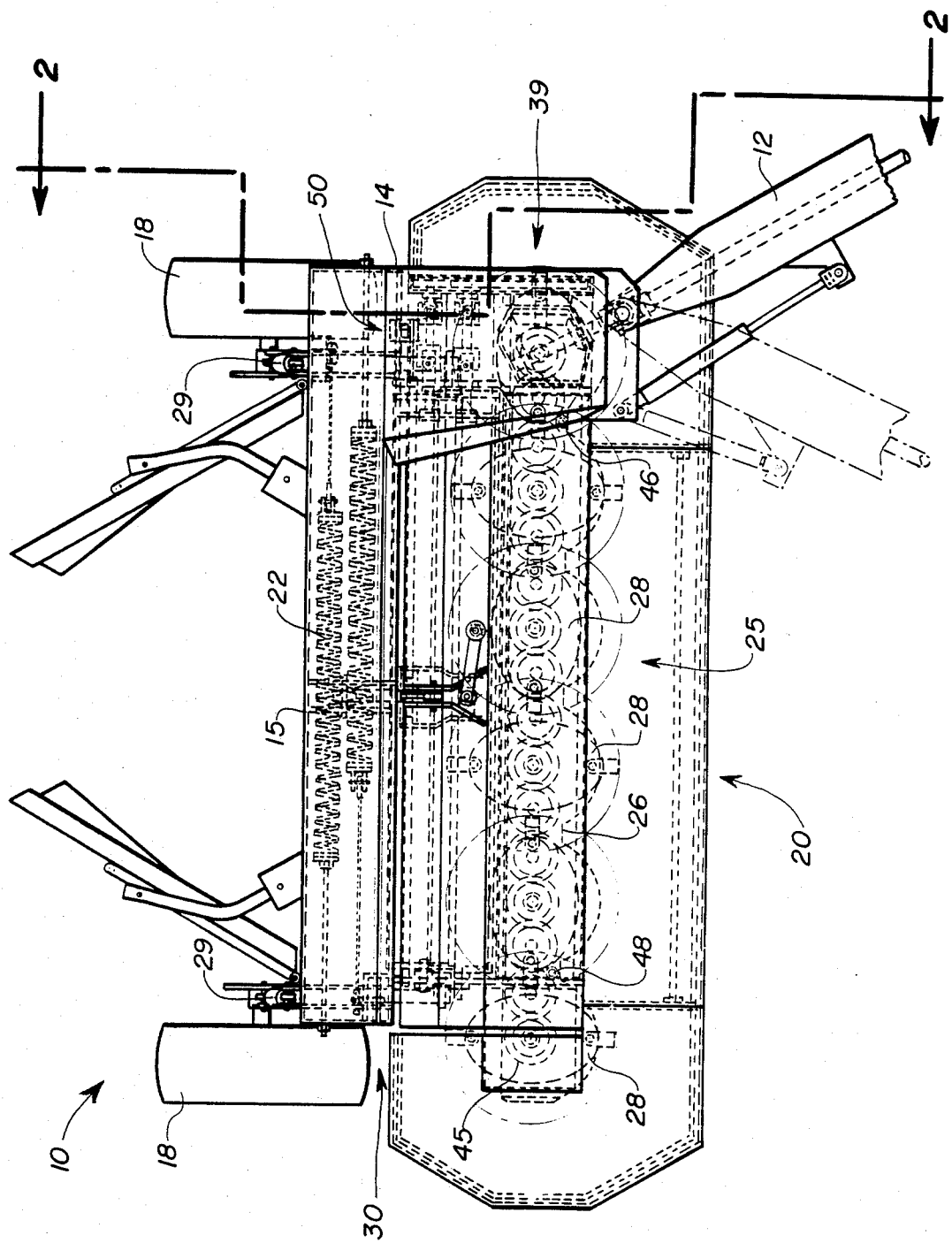
FIG. 1 is a top plan view of a disc mower-conditioner incorporating the principles of the instant invention, a portion of the draft member being broken away.

Referring now to the drawings, and particularly to FIG. 1, a top plan view of a hay harvesting machine, commonly referred to as a disc mower-conditioner, can be seen. Any left and right references are used as a matter of convenience and are determined by standing at the rear of the mower-conditioner, facing the forward end, the direction of travel. The mower-conditioner 10 is shown in the form of a pull-type machine having a draft member 12 pivotally connected to the frame 14 of the machine 10. The frame 14 includes a main transverse support beam 15 to which are connected downwardly depending legs 17 mounting wheels 18 for mobilely supporting wheels 10 over the ground G, as best seen in FIG. 2.

Figure 2:
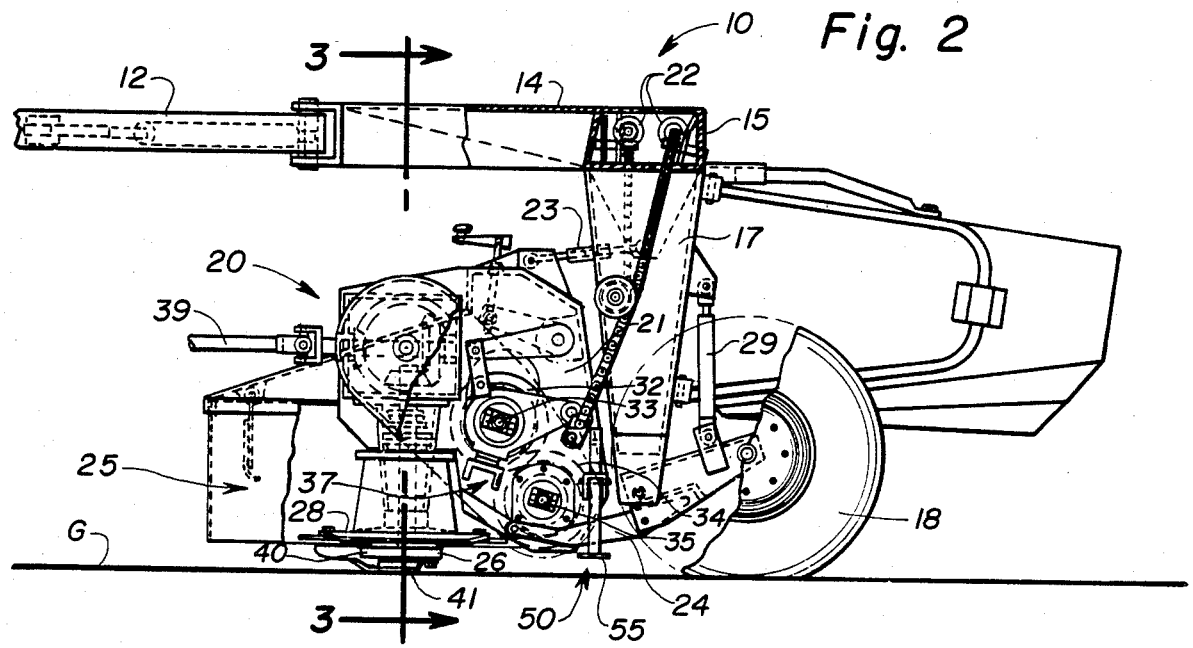
FIG. 2 is a side elevational view of a disc mower-conditioner seen in FIG. 1 with portions being broken away to better show the invention.

Referring to FIGS. 1 and 2, the mower-conditioner 10 includes a crop harvesting header 20 floatingly supported for movement over the ground G relative to the frame 14 by the counterbalancing mechanism 22 and upper and lower links 23, 24 interconnecting the header 20 and the frame 14. The header 20 is provided with a crop cutting mechanism 25, seen in the form of a disc cutterbar 26, such as a Kuhn three meter, six rotor rotary cutterbar, having a plurality of transversely spaced disc cutter members 28 operable to sever standing crop material by an impact action. A conditioning mechanism 30 is mounted in the header 20 rearwardly of the cutting mechanism 25 to receive and condition crop material severed by the cutterbar 26. The header 20 can be raised relative to the frame 14 in a conventional manner by a header lift mechanism 29, shown in the form of a hydraulic cylinder interconnecting each lower link 24 and the corresponding leg 17.

The conditioning mechanism 30 includes a pair of cooperable, generally vertically spaced transverse conditioning rolls 32, 34 operable to condition sever crop material passing therebetween. Each roll 32, 34 is rotatably mounted within the header 20 such that the axis of rotation 33 of the upper conditioning roll 32 is spaced slightly forwardly of the axis of rotation 35 of the lower conditioning roll 34, so that the nip 37 formed therebetween is facing slightly downwardly toward the disc cutterbar 26. The preferred embodiment of the conditioning roll construction shown in FIGS. 1 and 2 is of the intermeshing lug design. A drive mechanism 39 provides a source of rotational power to both the cutting mechanism 25 and the conditioning mechanism 30 in a conventional manner.

Figure 3:
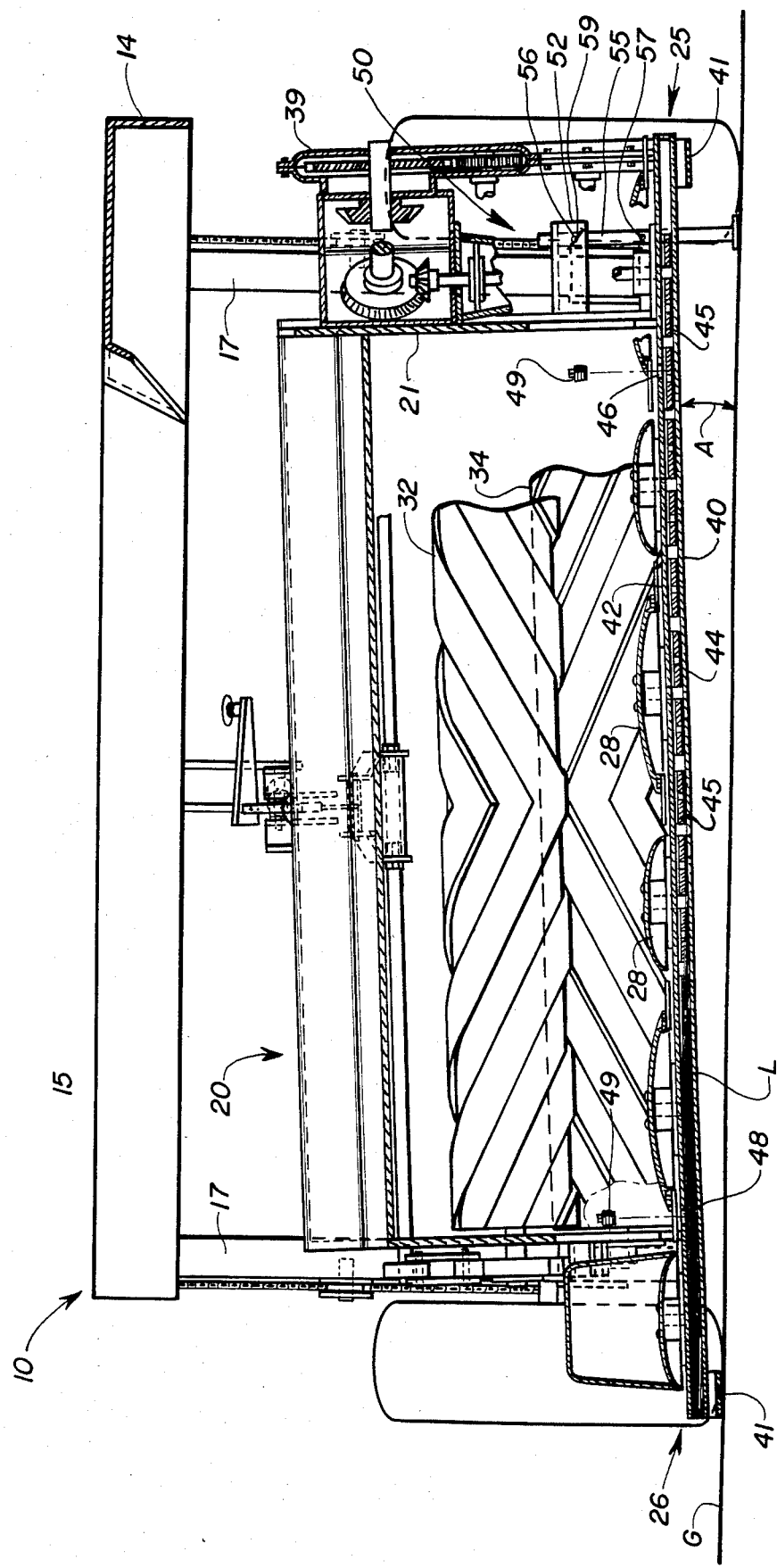
FIG. 3 is an enlarged cross-sectional view taken along lines 3—3 of FIG. 2, but with the machine elements being shown in the lubricant checking mode, selective structure being broken away to better show the invention, the thickness of the disc cutterbar support bar being somewhat exaggerated to better depict the invention and the fill plugs being shown exploded upwardly from their respective holes.

Referring now to FIGS. 1, 2 and 3, the apparatus for determining the proper lubricant volume within the disc cutterbar 26 can be seen. The disc cutterbar 26 includes a transverse support bar 40 having vertically spaced upper and lower surfaces 42, 44, respectively, and defining a generally hollow beam for the housing of drive transmission gears 45 within the support bar 40. The cutter members 28 are rotatably mounted on the upper surface 42 of the support bar 40 and are connected to a corresponding drive transmission gear 45 to affect rotation thereof. The upper surface 42 is also provided with a pair of fill holes 46, 48 spaced inwardly of the corresponding ends of the support bar 40. Each fill hole 46, 48 is provided with a removable plug 49 to permit access to the interior of the support bar 40. Ground engaging shoes 41 are affixed to the lower surface 44 of the support bar 40 to elevate the support bar 40 above the ground G.

A header tilt mechanism 50 is affixed to the left side sheet 21 of the header 20 to affect a tilting of the header 20 at a predetermined angle A relative to horizontal. The header tilt mechanism includes a bracket 52 affixed to the side sheet 21 for slidably receiving a jackstand 55 having a pair of openings 56, 57 extending therethrough. The position of the jackstand 55 relative to the bracket 52 can be secured through the use of a fastening member 59 extending through a corresponding hole in the bracket 52 and either the tilt opening 56 or the retracted opening 57, as will be described in further detail below.

Referring now to FIGS. 3-6, it can be seen that the jackstand 55 can be utilized to tilt the cutterbar 26 at the angle A to drain the fluid lubricant L within the support bar 40 to the lower end of the support bar 40. If the right fill hole 48 is positioned in the upper surface 42 such that the volume of the interior of the support bar 40 lying vertically beneath the right fill hole 48 when the support bar is inclined at the angle A is equal to the total recommended volume of fluid lubricant L for proper operation of the drive transmission gears within the support bar 40, the correct volume of lubricant L can be quickly and easily attained by filling the support bar 40 with lubricant L through the right fill hole 48 until the level of the lubricant L is at the fill hole 48.

Figure 4:
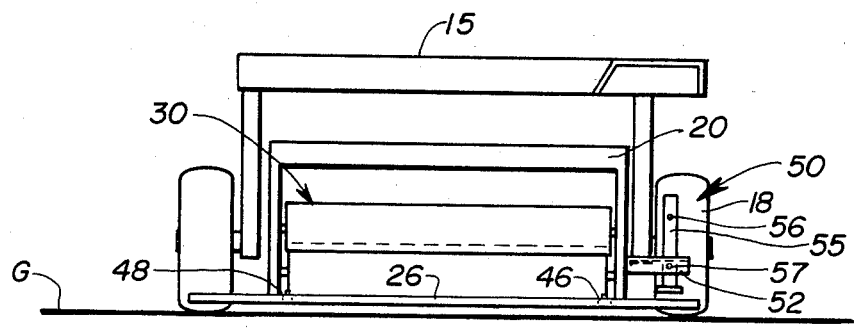
FIGS. 4, 5 and 6 are schematic front elevational views of the disc mower-conditioner seen in FIG. 1 for sequentially depicting the steps for checking the lubricant volume in the disc cutterbar, the fill plugs in FIG. 6 being shown exploded upwardly from their respective holes.
Figure 5:
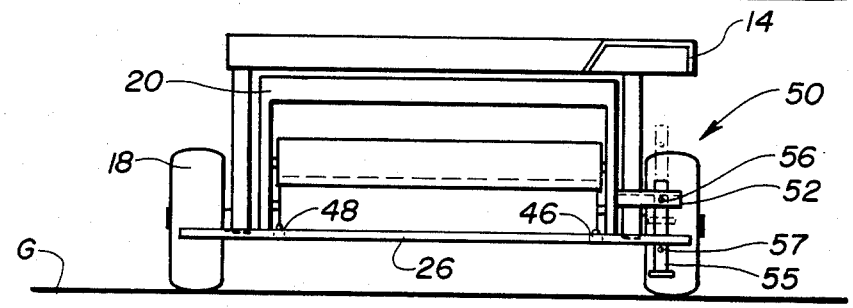
Figure 6:
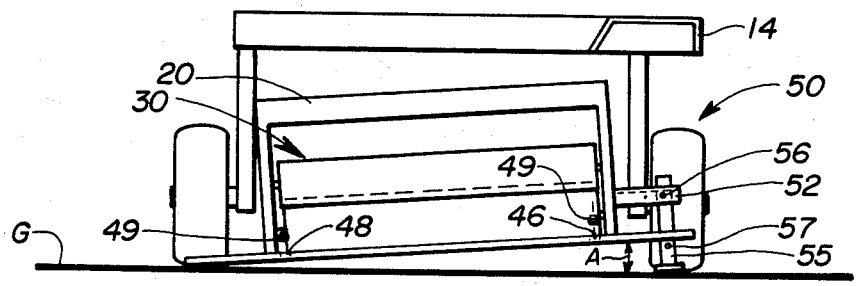

In operation, the header 20 can be moved from the operative position seen in FIG. 4 to a raised position seen in FIG. 5 by manipulation of the header lift mechanism 29. By removing the fastening member 59 from the retracted opening 57 of the jackstand 55, the jackstand can be moved from the retracted position seen in phantom in FIG. 5 to the tilting position shown in solid lines in FIG. 5. A reengagement of the fastening member 59 through the tilt opening 56 will lock the position of the jackstand 55 relative to the bracket 52 and permit the operator to affect a tilting of the cutterbar 26. By lowering the header 20 by appropriate manipulation of the header lift mechanism, the header 20 will assume the tilted position seen in FIG. 6 with the right ground engaging shoe 41 resting on the ground G and the left end of the header 20 being supported on the jackstand 55, such that the cutterbar 26 is tilted at the angle A relative to horizontal, when the machine 10 is situated on substantially level ground G.

As is noted above, when the support bar 40 has the proper amount of fluid lubricant L, the level of the lubricant L is at the right fill hole 48. The left fill hole 46 is utilized when adding lubricant to the right fill hole 48 to facilitate the removal of air from within the support bar 40. Once it has been determined that the proper volume of lubricant L is present within the support bar 40, the procedure noted above is reversed. With the header 20 raised by the header lift mechanism 29, the jackstand 55 can be returned to its retracted position by a repositioning of the fastening member 59 through the retracted opening 57 in the jackstand 55 and the corresponding opening in the bracket 52. A subsequent manipulation of the header lift mechanism 29 can return the header to the operative position seen in FIG. 4. Although the preferred embodiment for the instant invention is shown with respect to a disc mower-conditioner, one skilled in the art will readily realize that the disclosed method and apparatus for checking the volume of lubricant within a disc cutterbar can be equally applicable to a conventional rotary mower.

One skilled in the art will readily realize that an alternative embodiment of the above described invention would be to provide a linkage selectively attachable between the elevatable end of the header and the frame 14 of the machine such that as the header 20 is lowered, one end would be positioned higher than the other end with the support bar 40 being inclined at angle A to permit the lubricant to flow down to the lower without one end of the header 20 resting on the ground G. Although this mechanism would exclude the importance of positioning the machine 10 on substantially level ground, this alternative embodiment would be inherently more complex and also more expensive to manufacture.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific forms shown.

Having thus described the invention, what is claimed is:

1. In a harvesting machine having a mobile frame; conditioning means supported by said frame for conditioning crop material fed thereon; a header floatingly supported from said frame for generally vertical movement relative thereto, said header having first and second transversely spaced apart sidewalls; rotary cutting means mounted on said header forwardly of said conditioning means to sever standing crop material, said rotary cutting means including a transverse support bar rotatably mounting a plurality of rotary cutters, said support bar being a generally hollow member having opposing transverse ends and housing drive transmission means for transferring rotational power to said rotary cutters and a supply of fluid lubricant for lubricating said drive transmission means, said support bar having a fill hole therein for maintaining the supply of lubricant within said support bar, said fill hole being positioned between said transverse ends of said support bar; header lift means operably interconnecting said frame and said header for selectively effecting a generally vertical movement of said header relative to said frame; and drive means for delivering rotational power to said drive transmission means, the improvement comprising:

header tilt means for tilting said header at a predetermined angle inclined to horizontal such that one transverse end of said support bar can be positioned higher than the other transverse end to cause the supply of lubricant therein to flow to the lower transverse end, said fill hole being positioned such that the fluid level of said lubricant is at said fill hole when said support bar is positioned at said predetermined angle and when the proper volume of lubricant is present within said support bar.

2. The harvesting machine of claim 1 wherein said rotary cutting means is provided with ground engaging means proximate to each transverse end of said support bar.

3. The harvesting machine of claim 2 wherein said header tilt means is operably associated with said first sidewall.

4. The harvesting machine of claim 3 wherein said header tilt means is positionable in two positions, a retracted position, in which the ground engaging means at both transverse ends of said support bar are free to engage the ground, and a tilt position, in which the header tilt means engages the ground preventing the ground engaging means proximate to said first sidewall from engaging the ground.

5. The harvesting machine of claim 4 wherein said support bar is positioned at said predetermined angle when said support bar is positioned over a substantially level area of ground and said header tilt means is in said tilt position with the ground engaging means proximate to said second header sidewall being engaged with the ground.

6. The harvesting machine of claim 5 wherein said header tilt means includes a bracket affixed to said first header sidewall and a generally vertically movable jackstand slidably received within said bracket and having a ground engaging foot.

7. The harvesting machine of claim 6 wherein said jackstand has two vertically spaced apertures therethrough alignable with an appropriate opening in said bracket through which a fastener can be received, said jackstand apertures respectively corresponding to the positioning of said jackstand in said tilt and retracted positions.

8. The harvesting machine of claim 7 wherein said header lift means is operable to lift said header above the ground to permit a positioning of said jackstand in said tilt position before lowering said header toward the ground and effecting a positioning of said support bar at said predetermined angle.

9. The harvesting machine of claim 8 wherein said support bar includes an upper surface and a vertically spaced lower surface defining the top and bottom of said support bar, said drive transmission means being disposed between said upper and lower surfaces, said fill hole being formed in said upper surface.

10. The harvesting machine of claim 9 wherein said upper surface includes two transversely spaced fill holes positioned between said first and second sidewalls.

11. The harvesting machine of claim 10 wherein the fill hole closer to said second sidewall is used for the introduction of lubricant into said support bar, the fill hole closer to said first sidewall being used to permit air to escape from said support bar when lubricant is being introduced through the other said fill hole.

12. The harvesting machine of claim 11 wherein said drive transmission means includes gears rotatably mounted within said support bar in a drive transferring intermeshing relationship.

13. The harvesting machine of claim 12 wherein said rotary cutting means comprises a disc cutterbar.

14. A method of checking the level of lubricant in a mower-conditioner having a header provided with a rotary cutting mechanism including a hollow support bar housing drive transmission means and a desired volume of fluid lubricant therewithin, said support bar having a fill hole for the introduction of lubricant into said support bar, comprising the steps of:

tilting said rotary cutting mechanism from an operative position to a tilted position at a predetermined angle relative to horizontal by a tilting mechanism positioned adjacent one end of said rotary cutting mechanism, the position of said fill hole being such that the volume of said support bar below said fill hole when said rotary cutting mechanism is at said predetermined angle is substantially equal to the desired volume of lubricant;

adjusting the amount of lubricant within said support bar until the level of said lubricant is at said fill hole; and then returning said rotary cutting mechanism from said tilted position to said operative position.

15. The method of claim 14 wherein said tilting step includes the following steps:

raising said header from said operative position to an elevated position;

moving a jackstand disposed on one side of said header from a retracted position to a tilt position; and lowering said header until said header is supported at opposing ends by said jackstand and a ground engaging shoe.

16. The method of claim 15 further comprising the following step before said lowering step:

positioning said header over a substantially level area of ground so that when said header is supported at opposing ends by said jackstand and said ground engaging shoe, respectively, said rotary cutting mechanism is positioned at approximately said predetermined angle relative to horizontal.

17. The method of claim 16 wherein said moving step includes the following steps:

releasing a fastening member holding the jackstand in said retracted position with a bracket connected to a sidewall of said header;

dropping said jackstand from said retracted position to said tilt position; and repositioning said fastening member to hold said jackstand in said tilt position.

18. The method of claim 17 wherein said returning step includes the following steps:

reraising said header to said elevated position;

resecuring said jackstand in said retracted position; and relowering said header to said operative position.

19. The method of claim 14 wherein said adjusting step includes the following steps:

extracting a plug from said fill hole;

extracting a plug from an air hole transversely spaced along said support bar from said fill hole between said fill hole and the elevated end of said support bar;

adding a sufficient volume of lubricant to bring the level of said fluid lubricant to said fill hole; and replacing the plugs in both said fill hole and said air hole.

20. In a rotary mower having a generally hollow support bar defined by vertically spaced upper and lower surfaces; drive transmission members and a volume of fluid lubricant housed within said support bar; a plurality of transversely spaced disc cutter members rotatably mounted in the upper surface of said support bar and operably connected to said drive transmission means to affect a rotation thereof to sever standing crop material by impact action; said support bar having transversely spaced first and second ends defining the transverse width of said support bar, said upper surface having a fill hole positioned a predetermined distance from said first end of said support bar for the introduction of lubricant into said support bar, the improvement comprising:

tilt means operably associated with said second transverse end for selectively positioning said support bar at a predetermined angle inclined to horizontal such that the volume of said support bar vertically below said fill hole is substantially equal to the volume of lubricant recommended for proper operation of the drive transmission members.

21. The rotary mower of claim 20 wherein said tilt means includes a jackstand selectively positionable in a retracted position and in a tilt position to elevate said second transverse end.

22. The rotary mower of claim 21 wherein said support bar is provided with ground engaging means proximate to said first end of said support bar, said ground engaging means resting upon the ground when said support bar is positioned at said predetermined angle and said second end is supported by said jackstand in said tilt position.

23. The rotary mower of claim 22 wherein said upper surface of said support bar includes a second fill hole positioned between said first fill hole and said second end of said support bar.

* * * * *